(12) United States Patent
Kim

(10) Patent No.: US 8,504,106 B2
(45) Date of Patent: Aug. 6, 2013

(54) SMART CARD AND METHOD FOR MANAGING DATA OF SMART CARD, AND MOBILE TERMINAL

(75) Inventor: Kyoung-Tae Kim, Seoul (KR)

(73) Assignee: KT Corporation, Seongnam (KR)

( * ) Notice: Subject to any disclaimer, the term of this patent is extended or adjusted under 35 U.S.C. 154(b) by 0 days.

(21) Appl. No.: 13/286,797

(22) Filed: Nov. 1, 2011

(65) Prior Publication Data

US 2013/0109437 A1  May 2, 2013

(51) Int. Cl.
*H04B 1/38* (2006.01)
(52) U.S. Cl.
USPC ...................................... 455/558; 365/185.17
(58) Field of Classification Search
USPC ... 455/410–411, 414.1, 418–420, 556.1–558; 185/185.01–185.33
See application file for complete search history.

(56) References Cited

U.S. PATENT DOCUMENTS

| | | | |
|---|---|---|---|
| 7,177,190 B2 * | 2/2007 | Lee | 365/185.17 |
| 7,523,274 B2 * | 4/2009 | Ryu et al. | 711/154 |
| 2002/0186591 A1 * | 12/2002 | Lee et al. | 365/185.17 |
| 2012/0243319 A1 * | 9/2012 | Kasai et al. | 365/185.18 |

OTHER PUBLICATIONS

NAND vs. NOR Flash Memory—Technology Overview. Toshiba. http://www.chips.toshiba.com. Apr. 25, 2006.*

* cited by examiner

*Primary Examiner* — Kashif Siddiqui
(74) *Attorney, Agent, or Firm* — Sughrue Mion, PLLC

(57) ABSTRACT

Managing data of a smart card that includes a high-capacity memory and a high-speed memory. The high-capacity memory stores information and the high-speed memory stores an index to the information, and hence high-speed access to the high-capacity memory may be provided by referencing the index.

18 Claims, 3 Drawing Sheets

SMART CARD AND METHOD FOR MANAGING DATA OF SMART CARD, AND MOBILE TERMINAL

BACKGROUND

1. Field

Methods and apparatuses consistent with exemplary embodiments relate to a smart card and a method for managing data of a smart card, and a mobile terminal; and, more particularly, to a smart card and a method for managing data of a smart card, and a mobile terminal, which can store, manage, or use information related to a user equipment having a smart card built therein.

2. Description of Related Art

In these days, three schemes of mobile communication systems are generally used all over the world. The three schemes are classified into a scheme of a global system for mobile communication (GSM) system, which is a second-generation mobile communication system mainly used in Europe, a scheme of a synchronous code division multiple access (CDMA) 2000 system, which is mainly used in Korea and the USA, and a scheme of a universal mobile telecommunication services (UMTS) system, which is a third-generation mobile communication system mainly used in Europe.

The third generation partnership project (3GPP) leads the standardization of the UMTS system. The UMTS system is a standard developed by partially combining the CDMA technology with the GSM scheme. The UMTS system is different from the CDMA 2000 system in that the UMTS system does not use a global positioning system (GPS) in synchronization. Therefore, the UTMS system is referred to as an asynchronous mobile communication system. The UMTS system integrates various systems such as cellular phones, radiotelephones, wireless LANs, and satellite communications, and provides international roaming services so that conversation by telephones is possible all over the world. Further, the UTMS system supports multimedia services such as audio and video data at a variable transmission rate up to 2 Mbps, and is linked with various wideband networks. Therefore, the UTMS system is used in the same frequency band and under the same requirement condition as IMT-2000.

With the technology development of the third-generation mobile communication system, studies on a wideband code division multiple access (WCDMA) system have recently been conducted to build a future high-speed packet data transmission network. The WCDMA system has been developed based on the network structure of the existing GSM scheme. In the WCDMA system, synchronization between base stations is relatively easily performed, as compared with the existing synchronous CDMA system. Further, the WCDMA system is advantageous in building up infrastructures including installation of base stations, as compared with the existing synchronous CDMA system. In addition, the WCDMA system has high technical marketability and growth potential in the near future. High-quality multimedia data services such as videotelephony, streaming and video on demand (VOD), which were possible on a wired network, can be provided through the WCDMA system.

Meanwhile, a universal subscriber identity module (USIM) card is a smart card built in a WCDMA terminal using the third-generation mobile communication system. The USIM card basically provides user authentication and global roaming functions as subscriber identity module (SIM) and user identity module (UIM) cards provided them under GSM and CDMA environments. Furthermore, the USIM card supports various financial transaction services such as a transportation card service, a mobile banking service, a membership service, and a payment service.

The smart card generally includes a nonvolatile memory such as a ROM or EFPROM for storing information necessary for the aforementioned services. However, the nonvolatile memory has a very small storage capacity, and there is a limitation in repeatedly erasing and storing data of the nonvolatile memory.

SUMMARY

Aspects of the exemplary embodiments are directed to a smart card and a method for managing data of a smart card, and a mobile terminal, which can effectively manage and use information related to a user equipment having a smart card built therein.

Another aspect of an exemplary embodiment is directed to a smart card and a method for managing data of a smart card, and a mobile terminal, which can effectively manage and use high-capacity information related to a user equipment, such as directory information.

Other aspects can be understood by the following description, and become apparent with reference to the exemplary embodiments. Also, it is obvious to those skilled in the art to which the present disclosure pertains that the aspects of the exemplary embodiments can be realized by the means as claimed and combinations thereof.

In accordance with an exemplary embodiment, a smart card includes a high-capacity memory configured to store information; a high-speed memory configured to store index information that indexes the information stored in the high-capacity memory; and a transmission unit configured to transmit information stored in the high-capacity memory corresponding to selected index information stored in the high-speed memory.

In accordance with another exemplary embodiment, a mobile terminal includes an information request unit configured to request a universal subscriber identity module (USIM) of the mobile terminal for information stored in the USIM, and a reception unit configured to receive the information from the USIM. In the smart card, the USIM includes a high-capacity memory configured to store the information; a high-speed memory configured to store index information that indexes the information stored in the high-capacity memory; and a transmission unit configured to transmit, to the mobile terminal, information stored in the high-capacity memory corresponding to selected index information stored in the high-speed memory, based on the request of the information request unit.

In accordance with another exemplary embodiment, a method for managing data of a smart card includes storing, in a high-capacity memory, information; storing, in a high-speed memory, index information that indexes the information stored in the high-capacity memory; and transmitting information stored in the high-capacity memory corresponding to selected index information stored in the high-speed memory.

DESCRIPTION OF EXEMPLARY EMBODIMENTS

Figure 1:
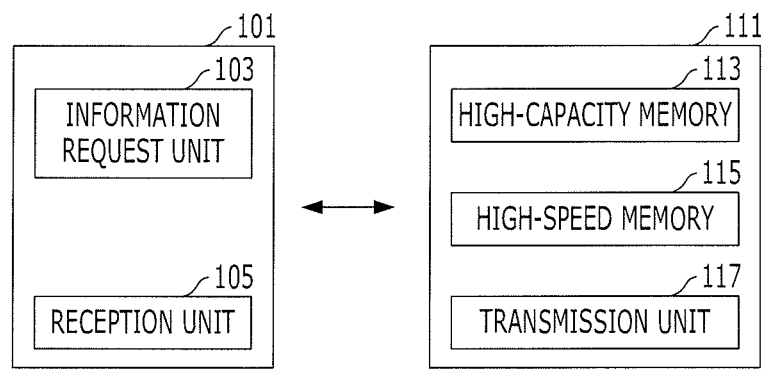
FIG. 1 is a block diagram illustrating a user equipment and a smart card in accordance with an exemplary embodiment.

Recently, application fields of a smart card have been extended so that information such as directories and messages are stored in the smart card built in a user equipment such as a mobile terminal, and a user of the user equipment identifies the information stored in the smart card as occasion demands. However, the information related to the user equipment, such as directories and messages, is of high capacity and frequently changed. Hence, it is difficult to store and manage high-capacity information such as directories and messages, using a memory such as RCM or EFPROM used in the conventional smart card.

A smart card according to the present disclosure includes a high-capacity memory and a high-speed memory. Information related to a user equipment having the smart card built therein is stored in the high-capacity memory, and index information corresponding to the user equipment related information is stored in the high-speed memory. The smart card transmits, to the user equipment, the information corresponding to index information selected by the user equipment.

While the high-capacity memory such as a NAND flash memory has a slow access speed, the smart card according to the present disclosure has improved data access speed using an additional high-speed memory such as a NOR flash memory. That is, the smart card according to the present disclosure does not transmit information related to the user equipment, stored in the high-capacity memory, to the user equipment at a time based on a request of the user equipment, but transmits, to the user equipment, the information corresponding to index information selected by the user equipment in index information stored in the high-speed memory, thereby improving the data access speed.

For example, it is assumed that 1000 telephone numbers are stored in the high-capacity memory, and the user equipment requests one telephone number of the 1000 telephone numbers. In the conventional smart card, all the 1000 telephone numbers are provided to the user equipment, and the user of the user equipment searches for the one telephone number from the 1000 telephone numbers. However, in the smart card according to the present disclosure, only index information corresponding to the 1000 telephone numbers is provided to the user equipment. Then, the user equipment can receive one telephone number from the smart card by selecting one of the index information provided from the high-speed memory.

According to the present disclosure, information related to the user equipment is stored and used in the smart card built in the user equipment, so that the information related to the user equipment can be effectively managed and used. Particularly, information related to the user equipment and index information are stored and managed in the high-capacity memory and the high-speed memory, respectively, so that the high-capacity memory can be stored and managed in the smart card without a decrease in data access speed.

Meanwhile, data stored in the smart card and data transmission/reception methods and the like are based on the 3GPP and international standardization organization-international electrotechnical commission (ISO/IEC) 8716 standard. The smart card which will be described hereinbelow includes a USIM card, a SIM card, a UIM card and a universal IC card (UICC) including all concepts of the three cards (SIM, UIM and USIM cards).

Exemplary embodiments will be described below in more detail with reference to the accompanying drawings. The exemplary embodiments may, however, be embodied in different forms and should not be construed as limited to the exemplary embodiments set forth herein. Rather, these exemplary embodiments are provided so that this disclosure will be thorough and complete, and will fully convey the scope of the disclosure to those skilled in the art. Throughout the disclosure, like reference numerals refer to like parts throughout the various figures and exemplary embodiments.

FIG. 1 is a block diagram illustrating a user equipment 101 and a smart card 111 in accordance with an exemplary embodiment.

As illustrated in FIG. 1, the user equipment 101 includes an information request unit 103 and a reception unit 105. The smart card 111 includes a high-capacity memory 113, a high-speed memory 115, and a transmission unit 117. In FIG. 1, the smart card 111 is built in the user equipment 101, and the user equipment 101 includes a terminal such as a mobile terminal, in which the smart card 111 can be built.

The high-capacity memory 113 stores information related to the user equipment having the smart card 111 built therein. The information related to the user equipment may be directory information including names and telephone numbers, or messages. Since the directory information or messages are of high capacity and frequently changed, the high-capacity memory 113 may be, for example, a NAND flash memory that is of high capacity and free for reading and writing.

The high-speed memory 115 stores index information on the information related to the user equipment. That is, the high-speed memory 115 stores index information indexed from the information related to the user equipment. For example, in a case where the information related to the user equipment is a directory, the index information may be serial numbers or names respectively corresponding to telephone numbers. The index information may be a value selected by a user or a predetermined value. The index information is changed depending on the information related to the user equipment, but has a low capacity. As described above, the index information is stored in the high-speed memory 115 to increase data access speed of the high-capacity memory 113. Therefore, the high-speed memory 115 may be, for example, a NOR flash memory that is free for reading and writing and has a fast data access speed.

The transmission unit 117 transmits, to the user equipment 101, the information corresponding to index information selected by the user equipment 101. That is, if index information is selected by the user equipment 101, the information corresponding to the index information may be transmitted to the user equipment 101 through the transmission unit 117. For example, in a case where index information on names, i.e., 'Hong-gildong' and 'John' is provided to the user equipment 101 and the name 'Hong-gildong' is selected by the user equipment 101, a telephone number corresponding to the name 'Hong-gildong' may be transmitted to the user equipment 101.

Hereinafter, the user equipment 101 will be described.

The information request unit 103 of the user equipment 101 requests the smart card 111 built in the user equipment 101 for information related to the user equipment. The information related to the user equipment may be requested based on index information. That is, the user of the user equipment 101 may select one of index information provided from the smart card 111, and the information request unit 103 may request the smart card 111 for information related to the user equipment, corresponding to the index information selected by the user of the user equipment 101.

Specifically, the information request unit may include an information generation unit for generating request information on the information related to the user equipment and an information transmission unit for transmitting the request information to the smart card 111.

The reception unit 105 receives information related to the user equipment from the smart card 111. The user equipment 101 displays the received information related to the user equipment.

The data transmission/reception process between the user equipment 101 and the smart card 111 will be briefly described as follows. First, if information related to the user equipment is generated in the user equipment 101, the generated information related to the user equipment is stored in the smart card 111. The smart card 111 simultaneously stores index information corresponding to the information related to the user equipment. In a case where the user equipment 101 requests the smart card 111 for information related to the user equipment, the smart card 111 provides index information to the user equipment 101. The user equipment 101 selects one of the index information, and the smart card 111 transmits, to the user equipment 101, the information corresponding to the index information selected by the user equipment 101.

Figure 2:
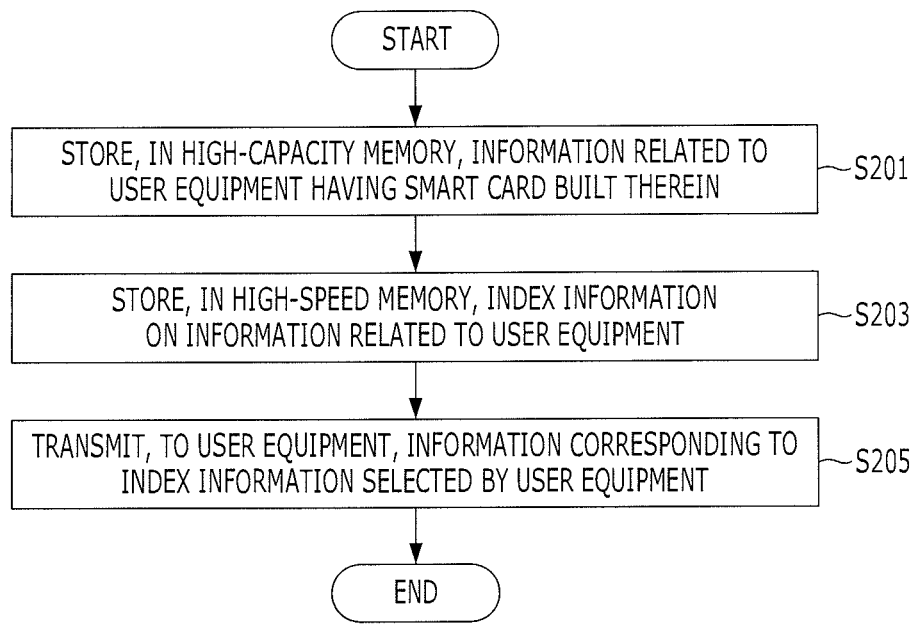
FIG. 2 is a flowchart illustrating a method of managing data of the smart card in accordance with an exemplary embodiment.

FIG. 2 is a flowchart illustrating a method of managing data of the smart card in accordance with an exemplary embodiment. In FIG. 2, the method for managing data of the smart card 111, illustrated in FIG. 1, will be described.

At step S201, the smart card 111 stores, in the high-capacity memory 113, information related to the user equipment 101 having the smart card 111 built therein. The smart card 111 may receive information related to user equipment, generated in the user equipment, based on a request of the user equipment 101, and store the received information in the high-capacity memory 113.

At step S203, the smart card 111 stores index information on the information related to the user equipment in the high-speed memory 115. The index information may be a value selected by a user or a predetermined value. For example, in a case where the information related to the user equipment is a directory, the index information may be serial numbers allocated to the names or telephone numbers of the directory numbers. In a case where the information related to the user equipment is a message, the index information may be a sender of the message or a serial number allocated to a sending number. The index information may be provided to the user equipment 101 based on the request of the user equipment 101, and the index information provided to the user equipment 101 is used to obtain information necessary for the user equipment 101 from the smart card 111.

At step S205, the smart card 111 transmits, to the user equipment 101, the information corresponding to the index information selected by the user equipment 101. That is, as described above, if the index information is provided to the user equipment 101, and the user equipment 101 selects one of the index information. The information related to the user equipment, corresponding to the selected index information, is transmitted to the user equipment 101.

The process may be controlled by a central processing unit (CPU) of the smart card 111. The CPU decides the information corresponding to the index information selected by the user equipment 101 and controls the smart card 111 to transmit the information related to the user equipment to the user equipment 101.

According to the exemplary embodiments, it is possible to solve the problem of a decrease in data access speed by using index information, and high-capacity data can be effectively managed using the smart card.

Meanwhile, the high-capacity memory may be a NAND flash memory, and the high-speed memory may be a NOR flash memory. The information related to the user equipment may be directory information including names and telephone numbers. In this case, the index information may be names.

Figure 3:
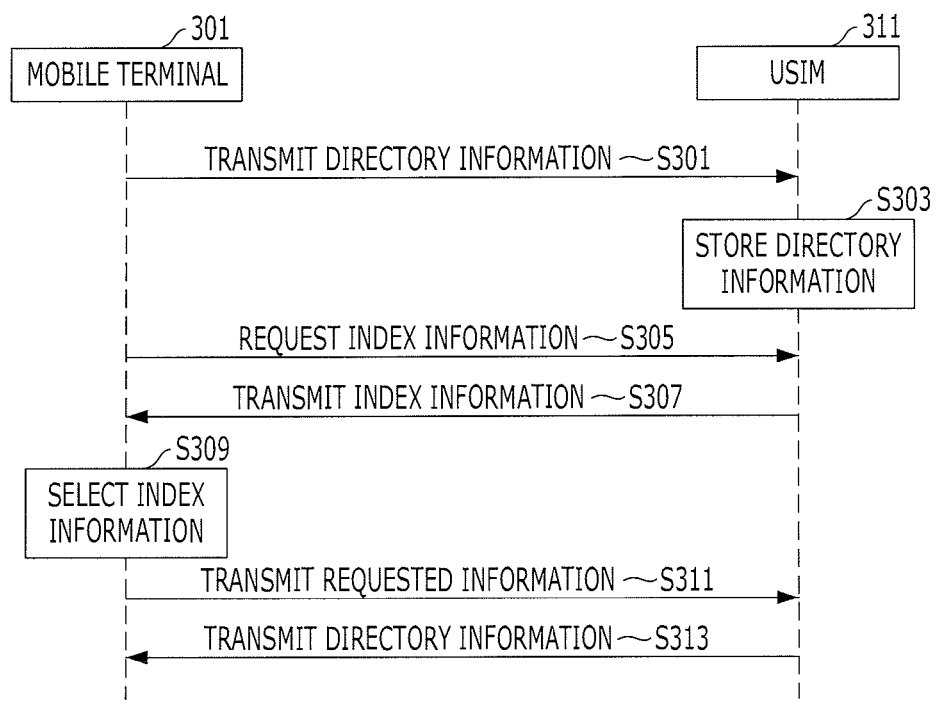
FIG. 3 is a sequence diagram specifically illustrating a method of managing data of the smart card in accordance with an exemplary embodiment.

FIG. 3 is a sequence diagram illustrating a method of managing data of the smart card in accordance with an exemplary embodiment. In FIG. 3, a case where the user equipment is a mobile terminal 301 and the smart card is a USIM 311 will be described.

The mobile terminal 301 transmits directory information including names, telephone numbers, and the like to the USIM 311 built therein (S301). The USIM 311 stores the directory information in a memory (S303). In this case, the USIM 311 stores the directory information in a NAND flash memory, and stores the names or serial numbers included in the directory information as index information in a NOR flash memory.

If the mobile terminal 301 requests the USIM 311 for index information so as to use the directory information (S305), the USIM 311 transmits the index information to the mobile terminal 301 (S307). The mobile terminal 301 selects index information based on a request of a user (S309), and transmits request information to the USIM 311 so as to request the USIM 311 of directory information corresponding to the selected index information (S311). The USIM 311 transmits the directory information corresponding to the index information to the mobile terminal 301 based on the request information (S313).

In accordance with the exemplary embodiments, information related to a user equipment is stored and used in a smart card built in the user equipment, so that it is possible to effectively mange and use the information related to the user equipment.

Further, information related to a user equipment and index information corresponding to the information are stored and managed in a high-capacity memory and a high-speed memory, respectively, so that it is possible to store and manage high-capacity data in the smart card without a decrease in data access speed.

The above-described methods can also be embodied as computer programs. Codes and code segments constituting the programs may be easily construed by computer programmers skilled in the art to which the disclosure pertains. Furthermore, the created programs may be stored in computer-readable recording media or data storage media and may be read out and executed by a processor of the computers. Examples of the computer-readable recording media include any computer-readable recoding media, e.g., intangible media such as carrier waves, as well as tangible media such as CD or DVD.

While the present disclosure has been described with respect to the exemplary embodiments, it will be apparent to those skilled in the art that various changes and modifications may be made without departing from the spirit and scope of the invention as defined in the following claims.

What is claimed is:

1. A smart card comprising:
   a high-capacity memory configured to store information;
   a high-speed memory configured to store index information that indexes the information stored in the high-capacity memory; and a transceiver configured to receive a request for information stored in the high-capacity memory, transmit index information of the information stored in the high-capacity memory based on an index stored in the high-speed memory, in response to the request, and receive a second request for selected information stored in the high-capacity memory that corresponds to the transmitted index information.

2. The smart card of claim 1, wherein the high-capacity memory is a NAND flash memory, and the high-speed memory is a NOR flash memory.

3. The smart card of claim 1, wherein the information is directory information comprising at least one name and at least one telephone number.

4. The smart card of claim 3, wherein the index information is at least one serial number allocated to the at least one name or the at least one telephone number.

5. The smart card of claim 1, wherein the smart card is one of a universal IC card (UICC), a universal subscriber identity module (USIM), a subscriber identity module (SIM), and a user identity module (UIM).

6. A mobile terminal comprising:
an information request unit configured to request a universal subscriber identity module (USIM) of the mobile terminal for information stored in the USIM; and
a reception unit configured to receive the information from the USIM,
wherein the USIM comprises:
a high-capacity memory configured to store the information;
a high-speed memory configured to store index information that indexes the information stored in the high-capacity memory; and
a transceiver configured to receive the request for information stored in the high-capacity memory, transmit, to the mobile terminal, index information of the information stored in the high-capacity memory based on an index stored in the high-speed memory, based on the request of the information request unit, and receive a second request for selected information stored in the high-capacity memory that corresponds to the transmitted index information.

7. A mobile terminal comprising:
an information request unit configured to request a universal subscriber identity module (USIM) of the mobile terminal for information stored in the USIM; and
a reception unit configured to receive the information from the USIM,
wherein the USIM comprises:
a high-capacity memory configured to store the information;
a high-speed memory configured to store index information that indexes the information stored in the high-capacity memory; and
a transmission unit configured to transmit, to the mobile terminal, information stored in the high-capacity memory corresponding to selected index information stored in the high-speed memory, based on the request of the information request unit,
wherein the information request unit comprises:
an information generation unit configured to generate request information on the information stored in the high-capacity memory using the index information; and
an information transmission unit configured to transmit the request information to the USIM.

8. The mobile terminal of claim 6, wherein the information stored in the high-capacity memory is directory information comprising at least one name and at least one telephone number, and the index information is at least one serial number allocated to the at least one name or the at least one telephone number.

9. The mobile terminal of claim 6, wherein the high-capacity memory is a NAND flash memory, and the high-speed memory is a NOR flash memory.

10. A method for managing data of a smart card, comprising:
storing, in a high-capacity memory, information;
storing, in a high-speed memory, index information that indexes the information stored in the high-capacity memory;
receiving a request for information stored in the high-capacity memory;
in response to the request, transmitting index information of the information stored in the high-capacity memory based on an index stored in the high-speed memory; and
receiving a second request for selected information stored in the high-capacity memory that corresponds to the transmitted index information.

11. The method of claim 10, wherein the high-capacity memory is a NAND flash memory, and the high-speed memory is a NOR flash memory.

12. The method of claim 10, wherein the information stored in the high-capacity memory is directory information comprising at least one name and at least one telephone number, and the index information is at least one serial number allocated to the at least one name or the at least one telephone number.

13. The method of claim 10, wherein the smart card is one of a universal IC card (UICC), a universal subscriber identity module (USIM), a subscriber identity module (SIM), and a user identity module (UIM).

14. A smart card comprising:
a NAND memory that stores information;
a NOR memory that stores an index of the information stored in the NAND memory; and
a processor that receives a request for information stored in the NAND memory, transmits index information of the information stored in the NAND memory based on the index stored in the NOR memory in response to the request, receives a second request for selected information stored in the NAND memory that corresponds to a selection from the transmitted index information, and obtains the selected information from the NAND memory based on the selection and transmits the selected information in response to receiving the second request.

15. The smart card according to claim 14, wherein the information stored in the NAND memory comprises a directory of telephone numbers.

16. The smart card according to claim 15, wherein the index stored in the NOR memory comprises serial numbers of the telephone numbers in the directory of telephone numbers.

17. The smart card according to claim 14, wherein the information stored in the NAND memory comprises a directory of messages.

18. The smart card according to claim 17, wherein the index stored in the NOR memory comprises one of serial numbers or identities of senders of the messages of the messages in the directory of messages.

* * * * *